Jan. 27, 1970  R. R. CANDOR ET AL  3,491,387
LAUNDRY APPARATUS AND METHOD
Filed Jan. 30, 1968  5 Sheets-Sheet 1
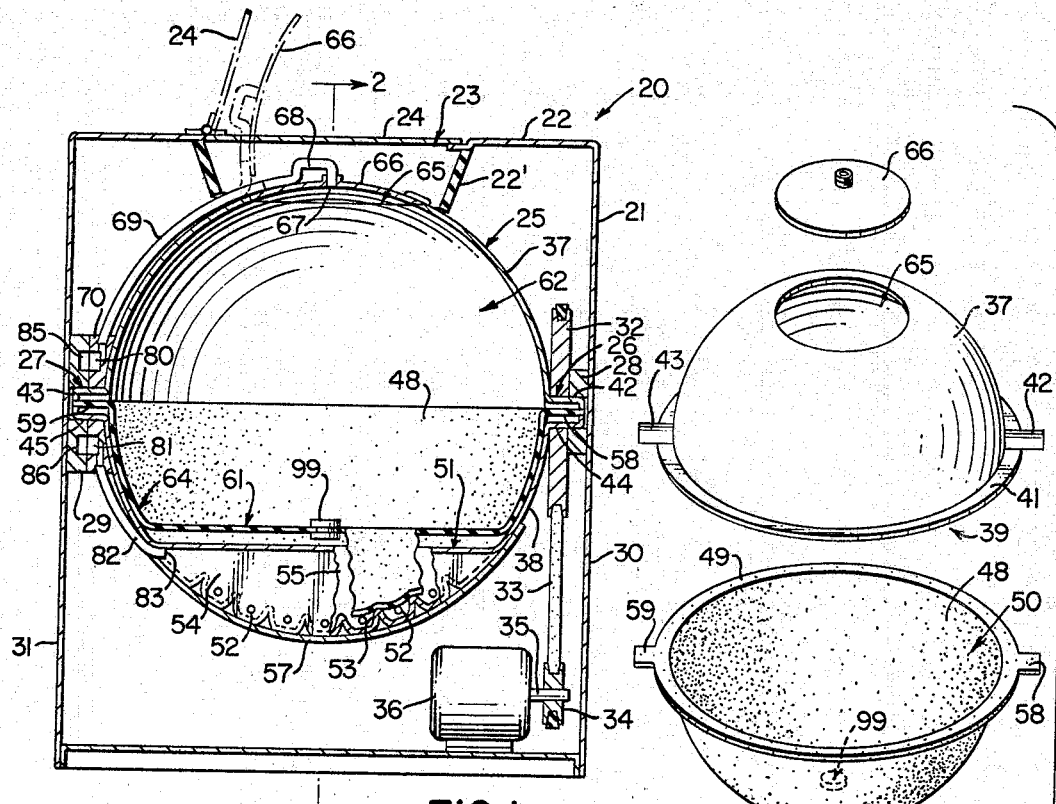
FIG.1
FIG.3
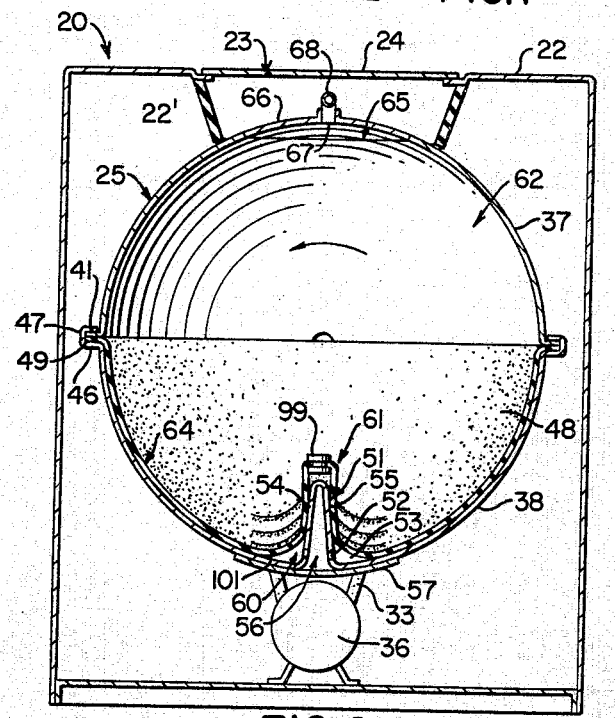
FIG.2
INVENTORS
ROBERT R. CANDOR &
JAMES T. CANDOR
BY
Candor & Candor
THEIR ATTORNEYS

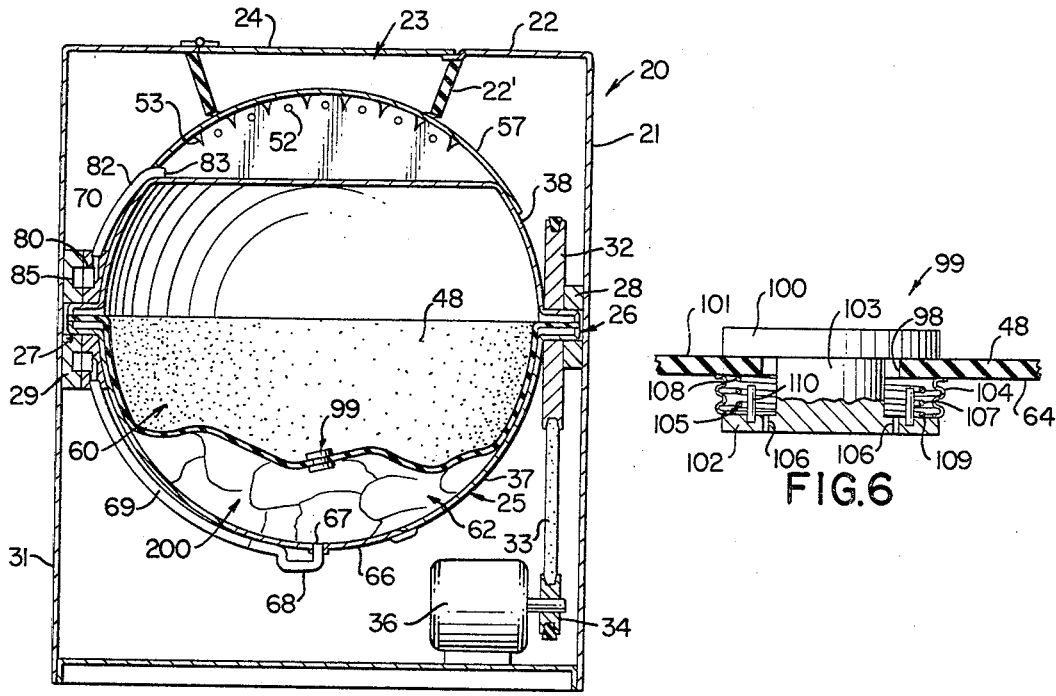
FIG. 4
FIG. 6
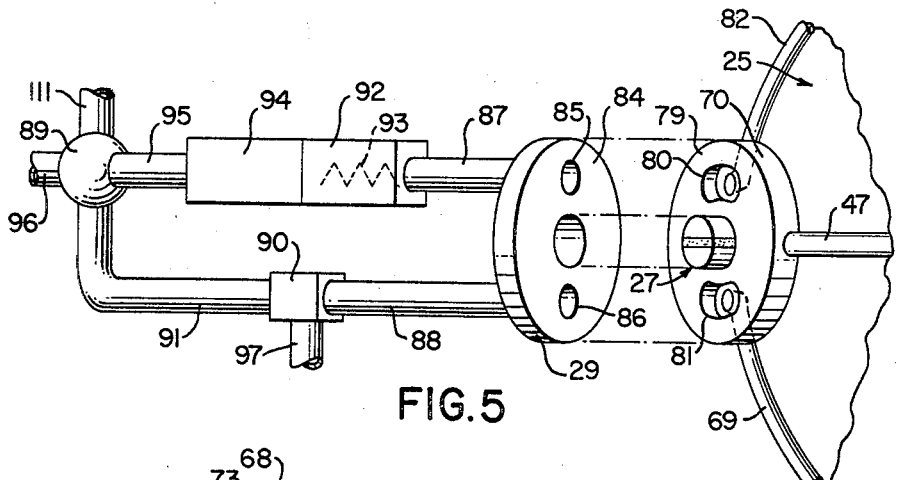
FIG. 5
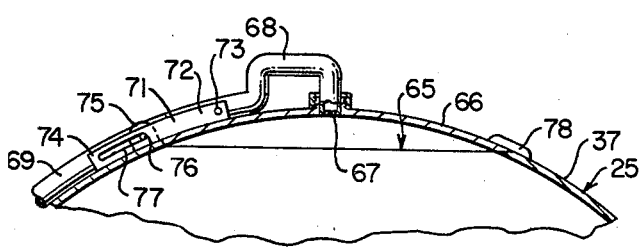
FIG. 7
INVENTORS
ROBERT R. CANDOR &
JAMES T. CANDOR
BY *Candor & Candor*
THEIR ATTORNEYS

INVENTORS
ROBERT R. CANDOR &
JAMES T. CANDOR

BY *Candor & Candor*

THEIR ATTORNEYS

INVENTORS
ROBERT R. CANDOR &
JAMES T. CANDOR

BY Candor & Candor

THEIR ATTORNEYS

INVENTORS
ROBERT R. CANDOR &
JAMES T. CANDOR

BY
*Candor & Candor*

THEIR ATTORNEYS

# United States Patent Office 3,491,387
Patented Jan. 27, 1970

3,491,387
LAUNDRY APPARATUS AND METHOD
Robert R. Candor, Miami Township, Ohio (5940 Munger Road, Dayton, Ohio 45459), and James T. Candor, Washington Township, Ohio (5440 Cynthia Lane, Dayton, Ohio 45429)
Continuation-in-part of application Ser. No. 690,636, Dec. 14, 1967, which is a continuation-in-part of application Ser. No. 635,848, May 3, 1967. This application Jan. 30, 1968, Ser. No. 701,602
Int. Cl. D06f 29/00
U.S. Cl. 8—158      16 Claims

ABSTRACT OF THE DISCLOSURE

This disclosure relates to a laundry machine having a confining means that has its interior surface means defining a tumble-free chamber for receiving and supporting laundry therein, part of the interior surface means of the confining means comprising a flexible member that defines a nozzle end means having an opening means adapted to be disposed against the laundry when expanded and permit a direct fluid flow between the opening means of the nozzle end means and an apertured section of the interior wall means of the confining means to treat the laundry disposed therebetween with a treating fluid.

---

This application is a continuation-in-part application of our co-pending patent application, Ser. No. 690,636, filed Dec. 14, 1967, which, in turn, is a continuation-in-part application of our co-pending parent patent application, Ser. No. 635,848, filed May 3, 1967, now U.S. Patent No. 3,447,174.

While the aforementioned two co-pending patent applications disclose a laundry machine wherein a nozzle means is disposed inside the laundry receiving chamber and is mounted on an end wall of the chamber defining confining means to rotate in unison therewith and be disposed substantially in the middle of the confining means chamber, it has been found according to the teachings of this invention that the resulting chamber of such a laundry machine is not tumble-free in that the laundry must tumble around such inside nozzle means as the confining means and nozzle means rotate.

Accordingly, it is a feature of this invention to improve upon such a laundry machine by forming the nozzle means thereof as part of the interior wall means of the confining means that confines the laundry receiving chamber whereby when the nozzle means is in one position thereof, the laundry receiving chamber is substantially tumble-free and there can be no tendency for any laundry therein to wind around such nozzle means as the nozzle means is defining part of the interior surface means of the confining means.

However, such nozzle means can be expanded according to the teachings of this invention toward the laundry so that an opening means of the nozzle means will be placed in substantially sealed relation against the laundry to compress the same against an apertured section of the confining means that also defines part of the interior surface means whereby a direct fluid flow can be provided between the opening means of the nozzle means and the apertured section so that the laundry trapped therebetween can be directly treated by the fluid flow between the opening means of the nozzle means and the apertured section.

In particular, one embodiment of this invention provides a confining means formed of two substantially hemispherical rigid parts secured together at their open ends while trapping and securing an outer peripheral flange means of a flexible substantially hemispherical member therebetween, the flexible member being adapted to be disposed against the interior surface of one of the rigid hemispherical parts to cooperate with interior surface means of the other hemispherical rigid part to define a tumble-free laundry receiving and supporting chamber therebetween. The flexible member has an opening means and is adapted to be expanded or moved toward an apertured section in the other hemispherical rigid part to trap the laundry therebetween and provide a direct fluid flow between the opening means of the flexible member and the apertured section of the other rigid member in order to treat the laundry therebetween with a treating fluid, such as a cleaning liquid and/or heated air as will be apparent hereinafter. Also, such moved flexible member applies a squeezing force to such trapped laundry to further remove moisture therefrom as will be apparent hereinafter.

Accordingly, it is an object of this invention to provide an improved laundry machine or the like having one or more of the novel features set forth above or hereinafter shown or described.

Another object of this invention is to provide an improved method for treating laundry or the like, the method of this invention having one or more of the novel features set forth above or hereinafter shown or described.

Other objects, uses and advantages of this invention are apparent from a reading of this description which proceeds with reference to the accompanying drawings forming a part thereof and wherein:

FIGURE 1 is a cross-sectional view of a laundry apparatus of this invention.

FIGURE 2 is a cross-sectional view of the laundry apparatus of FIGURE 1 and is taken substantially on line 2—2 thereof.

FIGURE 3 is a exploded perspective view illustrating certain parts of the laundry confining means of the apparatus of FIGURE 1.

FIGURE 4 is a view similar to FIGURE 1 and illustrates the laundry apparatus in another operating position thereof.

FIGURE 5 is a schematic view illustrating the fluid control system for the apparatus of FIGURE 1.

FIGURE 6 is an enlarged, fragmentary, cross-sectional view illustrating the nozzle opening means for the apparatus of FIGURE 1.

FIGURE 7 is an enlarged, fragmentary, cross-sectional view illustrating the door means for the confining means of the apparatus of FIGURE 1.

Figure 8:
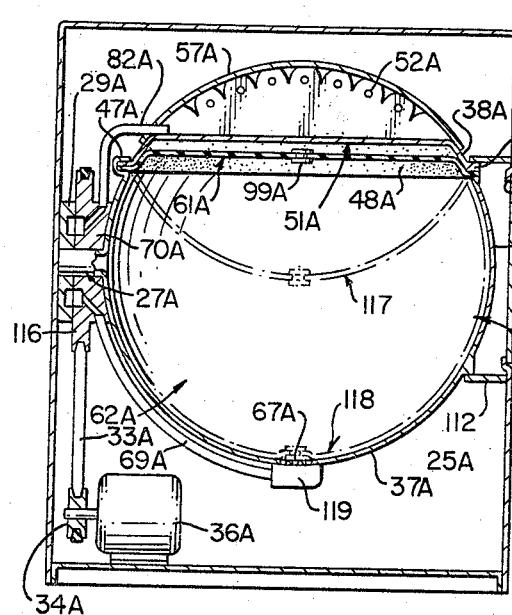
FIGURE 8 is a view similar to FIGURE 1 and illustrates another laundry apparatus of this invention.

While the various features of this invention are hereinafter described and illustrated as being particularly adaptable for providing a laundry apparatus and method, it is to be understood that the various features of this invention can be utilized singly or in any combination thereof to provide other types of treating apparatus and methods as desired.

Therefore, this invention is not to be limited to only the embodiments illustrated in the drawings, because the drawings are merely utilized to illustrate some of the wide variety of uses of this invention.

Referring now to FIGURES 1 and 2, one laundry apparatus of this invention is generally indicated by the reference numeral 20 and comprises an outer casing for frame structure 21 having a top wall 22 provided with an openings means 23 that is opened and closed by a hinged door or lid means 24.

A rotatably mounted, substantially spherical confining means 25 is disposed in the casing 21 and has outwardly extending diametrically opposed shaft means 26 and 27 respectively received in stationary bearing means 28 and 29 respectively secured to the front and back wall means 30 and 31 of the frame structure 21. The shaft means 26 of the confining means 25 carries a pulley 32 which is adapted to be driven by a continuous belt means 33 disposed around the pulley 32 as well as a drive pulley 34 mounted on an output shaft 35 of a suitable drive motor 36 whereby the motor 36 is adapted to rotate as well as index the spherical confining means 25 about a horizontal axis passing longitudinally through the shaft means 26 and 27 and in a counterclockwise direction as illustrated in FIGURE 2 for a conventional laundry treating cycle or the like as will be apparent hereinafter.

As illustrated in FIGURES 1–3, the spherical confining means 25 comprises two substantialy hemispherical rigid parts 37 and 38 respectively having open ends 39 and 40. The rigid part 37 has an outwardly directed peripheral flat flange 41 at the open end 39 thereof and has formed integrally therewith half shaft parts 42 and 43 which cooperate with similar half shaft-like parts 44 and 45 at the open end 40 of the other rigid part 38 to define the substantially cylindrical shaft means 26 and 27 when the rigid parts 37 and 38 are assembled together in a manner hereinafter described. Of course, the shaft means 26 and 27 could be separate parts subsequently secured to the assembled confining means 25, if desired.

The rigid part 38 is provided with an outwardly directed flat flange means 46 and an upstanding flange means 47 which is adapted to be turned over the flat flange means 41 of the rigid part 37 when assembled therewith to secure the rigid parts 37 and 38 together.

A substantially hemispherical flexible member 48 is adapted to be assembled with the rigid parts 37 and 38 by having an outwardly directed peripheral flange means 49 extending outwardly from the open end 50 thereof disposed between the flat flange means 46 and 41 of the rigid parts 38 and 37 in manner illustrated in FIGURES 1 and 2 so as to not only seal together the open ends 39 and 40 of the rigid members 37 and 38, but also to be secured to the parts 37 and 38 to cooperate with the same in a manner hereinafter described.

Since the resulting confining means 25 of the laundry machine 20 of this invention is substantially spherical in its assembled condition, the rigid parts 37 and 38 can be simply and economically formed from a lightweight metal, such as aluminum or the like, as well as from other materials, such as plastics and the like, by a suitable stamping and/or drawing process in much the same manner as the two hemispherical parts of a "kettle-type" barbecue grill.

In any event, the rigid part 38 of the confining means 25 has an inward directed integral rib means or projection 51 formed therein to extend across the same as illustrated in FIGURE 1 and can be formed in any suitable manner, such as by a drawing operation. In any event, the inwardly directed projection 51 of the rigid member 38 defines a substantially inverted V-shaped cross-sectional configuration as illustrated in FIGURE 2 and is provided with a plurality of apertures 52 adjacent the bottom thereof and intermediate integrally formed ribs 53 that extend outwardly from the opposed sides 54 and 55 of the projection 51 any desired distance. In particular, while the ribs 53 only extend slightly outwardly from the sides 54 and 55 of the projection 51 in the manner illustrated in FIGURE 2 for a purpose hereinafter described, it is to be understood that such ribs 53 could extend in a parallel manner to almost the open end 40 of the rigid part 38, if desired.

The open end 56 of the projection 51 as illustrated in FIGURE 2 can be sealed closed by a suitably shaped plate means 57 formed of suitable material, such as plastic, rubber or metal as desired.

Since the flange means 49 of the flexible member 48 can have outwardly extending projections 58 and 59 that are disposed between the cooperating half shaft parts 42, 44 and 43, 45 when the rigid parts 37 and 38 are assembled together, the turning over of the flange means 47 of the rigid part 38 on top of the flange means 41 of the rigid member 37 not only secures the parts 37 and 38 together, but also completely seals the parts 37 and 38 together to define a sealed closed chamber 60 between the flexible member 48 and the interior surface of the rigid part 38 while the flexible member 48 is adapted to be disposed against the interior surface of the rigid member 38 to substantially conform to the inside wall configuration thereof as well as to the configuration of the inwardly disposed projection 51 of the rigid part 38 to define an internal baffle means 61 that projects inwardly into a substantially spherically shaped laundry receiving and supporting, tumble-free chamber 62 defined in the confining means 25 between the interior surface means of the rigid member or part 37 and the cooperating facing or inner surface 64 of the flexible member 48 as illustrated in FIGURES 1 and 2.

An access opening 65 is formed in the center of the bottom of the rigid member 37 and is adapted to be opened and closed by a door 66 which completely seals the opening 65 when in its closed position as illustrated in FIGURES 1, 2, 4 and 7 to make the laundry receiving chamber 62 liquid-retaining as will be apparent hereinafter.

As illustrated in FIGURE 7, the door 66 has a central aperture means 67 therein which is disposed in sealed fluid communication with a conduit means 68 secured to the door 66 and formed in the shape of a handle for opening and closing the door 66, the conduit 68 when in its closed position being disposed in sealed fluid communication with a conduit 69 leading to a valve plate member 70 fixed to the exterior surface of the confining means 25 and being concentric with the shaft means 27 thereof to cooperate with a valve part of the stationary bearing means 29 in a manner hereinafter described. For example, the door 66 can be hinged to the part 37 of the confining means by a pair of link means 71 each having one end 72 pivotally mounted to the door 66 by a pivot pin 73 and its other end 74 pivotally mounted to an ear means 75 of the part 37 by pivot pin means 76 that is received in an elongated slot means 77 of the link 1. Manually movable latch means 78 can be carried by the part 37 to latch the door 66 in its fully closed position as illustrated in FIGURE 7.

However, when the housewife or the like desires to introduce clothes and the like into the chamber 62, as well as to remove the same therefrom, the door means 66 can be opened and moved to the position illustrated in FIGURE 1 by broken lines for such purposes.

Of course, the door means 66 can be made movable relative to the opening means 65 of the confining means 25 in any suitable manner with the understanding that when the door means 66 is in its closed position, the same renders the chamber 62 of the confining means 25 liquid retaining for a purpose hereinafter described. Also, the apertured section 67 of the part 37 can be interconnected to the conduit 69 by a flexible conduit means to permit opening and closing movement of the door 66.

As illustrated in FIGURE 5, the valve plate 70 carried by the confining means 25 has a flat valve surface 79 interrupted by a pair of diametrically opposed kidney shaped openings 80 and 81 with the opening 81 being in fluid communication with the conduit 69 leading to the aperture means 67 in the door means 66 while the opening 80 is in fluid communication with a conduit 82 having its outer end 83 sealed to and passing through a suitable opening in the plate 56 so as to be in fluid communication with the previously described chamber 60 defined between the flexible member 48 and the housing part 38.

The stationary bearing and valve member 29 carried by the wall 31 of the frame 21 has a flat valve surface 84 adapted to seal against the flat surface 79 of the valve plate 70 while permitting the valve plate 70 to rotate relative thereto in unison with the confining means 25 rotating on the axis of the shaft means 26 and 27 as previously described. The valve surface 84 of the stationary valve plate and bearing 29 is interrupted by a pair of diametrically opposed openings 85 and 86 respectively disposed in fluid communication with conduit means 87 and 88, the openings 85 and 86 respectively and simultaneously being adapted to be disposed in fluid alignment with the openings 80 and 81 or conversely with the openings 81 and 80 depending upon the indexed rotational position of the valve plate 70 relative to the fixed valve plate 29 as hereinafter described.

The conduit 88 illustrated in FIGURE 5 is adapted to be fluidly interconnected to one side of a reversible fluid pump 89 and the conduit 87 is adapted to be fluidly interconnected to the opposite side of the fluid pump 89.

In particular, the conduit 88 is disposed in fluid communication with a solenoid operated valve 90 which, in one operating position thereof, will interconnect the conduit 88 with a conduit 91 that is disposed in fluid communication with one side of the fluid pump 89.

The conduit 87 is disposed in fluid communication with a chamber defining means 92 containing an electrical heater 93 for heating the fluid passing therethrough. The chamber defining means 92 is, in turn, disposed in fluid communication with a moisture separator or condenser 94 which will separate the moisture from air and the like as the same passes therethrough only from left to right in FIGURE 5 and will cause such separated moisture to be expelled from the chamber means 94 in a conventional manner, the chamber defining means 94 being in fluid communication with a conduit 95 leading to one side of the fluid pump 89.

The fluid pump 89 can be a reversible fluid pump so that at certain times its inlet can be interconnected to the conduit 91 and its outlet interconnected to the conduit 95 or have its inlet interconnected to the conduit 91 while its outlet is interconnected to conduit 96 while permitting the conduit 95 to be interconnected to the atmosphere by interconnecting the conduit 95 to an air source conduit 111.

The solenoid operated valve 90 illustrated in FIGURE 5 when in another operating position thereof disconnects the conduit 91 from the conduit 88 while interconnecting a liquid filling or source conduit 97 to the conduit 88 for a purpose hereinafter described.

The flexible member 48 of the confining means 25 has an opening means 98 in the center of the bottom thereof which can be opened and closed by a valve means 99 as illustrated in FIGURE 6. As illustrated in FIGURE 6, the flexible member 48 has the opening means 98 passing centrally therethrough with the valve member 99 comprising a first valve plate 100 for closing the opening 98 when disposed in the position illustrated in FIGURE 6 and sealing against the outer side 101 of the flexible member 48 that faces the rigid part 38. Another valve plate 102 is fastened to the valve plate 100 by a stem portion 103 passing through the opening 98 in the flexible member 48 whereby the valve plate 102 is disposed on the laundry chamber side 64 of the flexible member 48 and is sealed to the inner side 64 of the flexible member 48 by a flexible annular bellows means 104 which cooperates with the valve stem 103 and flexible member 48 to define a chamber 105 disposed in fluid communication with the opening 98 in the flexible member 48 and with a plurality of passages 106 passing through the valve part 102 in a circumferential manner outboard of the valve stem 103.

The valve plate 100 is urged to its closing position by a compression spring 107 disposed in the chamber 105 and having one end 108 bearing against the side 64 of the flexible member 48 and the other end 109 bearing against the valve part 102. When the valve 100 is moved away from sealing engagement with the side 101 of the flexible member 48 in opposition to the force of the compression spring 107 in a manner hereinafter described, such upward movement of the part 100 is limited by stop means 110 carried by the valve part 102 abutting against the side 64 of the flexible member 48 which permits the chamber 60 between the flexible member 48 and the outer rigid member 38 to now be disposed in fluid communication with the passages 106 through the thus opened opening means 98 for a purpose hereinafter described.

The operation of the laundry machine 20 will now be described.

Conventional sensing and indexing mechanism is provided so that in any "off" condition or end of cycle condition of the laundry machine 20, the door means 66 of the confining means 25 will have been oriented with the opening 23 in the top 22 of the frame 21 so that the confining means 25 assumes the position illustrated in FIGURES 1 and 2 at the end of cycle position thereof or when the housewife or the like desires to terminate the operation of the laundry machine 20 by turning the same "off" even before a particular previously initiated cycle of operation has been completed.

Thus, with the confining means 25 disposed in the position illustrated in FIGURES 1 and 2, the housewife or the like opens the doors 24 and 66 as illustrated by phantom lines in FIGURE 1 and disposes the laundry or other articles to be cleaned into the chamber 62 of the confining means 25 along with the desired quantity of detergent and other treating material, if the laundry machine 20 does not have separate dispensers for the same as would be apparent to a person skilled in the art.

Thereafter, the housewife or the like latches the door 66 in its closed position and closes the lid 24 which must remain in its closed position during the operation of the laundry machine 20 so that if the door 24 is ever opened after the starting of a laundry cycle, the movement of the confining means 25 is automatically stopped in a manner conventional in the art as a safety feature. A gasket-like member 22' can be carried by the top 22 of the frame 21 to surround the opening 23 in the top 22 and the opening 65 in the confining means 25 to prevent the housewife or the like from dropping clothes into the casing 21 between the casing 21 and confining means 25 as is obvious in the art.

After the housewife initiates the starting of a washing and drying cycle of the apparatus 20, the confining means 25 is indexed 180° to the position illustrated in FIGURE 4 and in this stopped condition of FIGURE 4, the solenoid operated valve means 90 of FIGURE 5 is operated to interconnect the treating liquid supply line 97 with the conduit 88 and since the opening 86 in the stationary valve part 29 is in alignment with the opening 81, the treating liquid enters the chamber 62 through the apertured section 67 of the door 66 to fill the chamber 62 with the desired quantity of liquid whereupon the valve means 90 will disconnect the conduit 97 from the conduit 88.

During such liquid filling operation, the air in the chamber 62 is being compressed by the entering liquid whereby such increased air pressure acts on the valve member 99 in opposition to the force of the compression spring 107 to cause the same to move to a position to open the opening 98 in the flexible member 48 so that such compressed air can be expelled out of the chamber 62 and into the chamber 60 between the flexible member 48 and the rigid member 38. Such escaping air thus exists from the chamber 60 through the conduit 82 and valve opening 80 into the valve opening 85 of the stationary valve part 29 to pass out through the pump 89 and atmosphere connecting line 111.

After the desired quantity of liquid has been introduced into the chamber 62, the pump 89 and solenoid valve 90 are so constructed and arranged that the same prevent the existing or escaping of fluid or liquid from the conduits 87 and 88 so that the confining means 25 now has its liquid retaining chamber 62 containing the desired quantity of treating liquid and clothes for a washing cycle.

Thus, the motor 36 is operated to rotate the confining means 25 in the condition illustrated in FIGURE 2 in a counterclockwise direction as indicated by the arrow in FIGURE 2 so as to agitate and tumble the clothes in the confining means 25 within the retained body of treating liquid in a manner similar to a normal washing cycle, the baffle means 61 assisting in such agitating cycle and causing a tumbling action of the clothes within the confining means 25 in a manner conventional in the art wherein internal baffle means are utilized for such purpose.

After the desired washing and agitating cycle has been completed, the control means for the apparatus 20 positions the confining means 25 in the position illustrated in FIGURE 4 and while in this stopped condition the body of liquid is removed from the chamber 62 by the operation of the pump 89 having one of its inlet sides interconnected to the conduit 91 and the outlet for such inlet interconnected to the drain conduit 96. In addition, the pump 89 has its other inlet side interconnected to the air supply conduit means 111 as illustrated in FIGURE 5 and the outlet therefor interconnected to the conduit 95.

Thus, it can be seen that the apertured section 67 of the chamber 62 is now interconnected to the drain 96 and the chamber 60 of the flexible member 48 is interconnected to an air supply means so that once the pump 89 is operating in the aforedescribed condition thereof, the body of liquid in the confining chamber 62 is being drained therefrom through the apertured section 67 and at the same time fluid under pressure is being directed into the chamber 60 by the pump 89 and since the valve member 99 is closing the opening 98 in the flexible member 48, such air pressure in the chamber 60 causes the flexible member 48 to move away from the rigid part 38 down toward the rigid part 37 in the manner illustrated in FIGURE 4 whereby the flexible member 48 is moved by air pressure into squeezing relation with all of the clothes trapped between such flexible member 48 and the rigid part 37 as illustrated in FIGURE 4 to squeeze the water therefrom and cause the same to flow cut of the apertured section 67 so that not only is the body of treating liquid removed from the confining chamber 62 in the above manner, but also the wet laundry remaining therein has a sufficient quantity of the liquid absorbed therein squeezed therefrom by the downwardly moving wall or nozzle end means 48. Such trapped clothes are generally indicated by the reference numeral 200 in FIGURE 4. Of course, often the body of liquid leaves the chamber 62 with the confining means 25 disposed in the position illustrated in FIGURE 4, the inlet of the pump 89 is still in fluid communication with the chamber 62 and the same tends to reduce the air pressure therein to further assist the squeezing action of the flexible member 48 against the clothes in such collapsed chamber 62 by the pressure differential being created across the flexible member 48 as the chamber 60 has a pressure above atmospheric pressure and the chamber 62 has a pressure below atmospheric pressure when the pump 89 is operating in the manner previously described.

Further, it is to be understood that once the valve member 99 is moved in a compressing manner against the clothes trapped between the valve member 89 and the apertured section 67 of the part 37, the valve member 99 is prevented from further moving downwardly in FIGURE 4 but the flexible member 48 can continue to move relative thereto in opposition to the force of the compression spring 107 until the same hits the stop means 110 whereby it can be seen that the air being forced into the chamber 60 by the operating pump 89 will begin to be forced from the chamber 60 through the now opened opening 98 and directly into the laundry trapped between the flexible member 48 and the apertured section 67 to flow directly through such laundry into such apertured section 67 to be drawn therefrom by the other inlet side of the pump 89.

In this manner, it can be seen that the treating liquid during the wash cycle can be readily and rapidly removed from the laundry and the laundry can be substantially squeezed by the flexible member 48 to remove a substantial part of the absorbed liquid remaining in the laundry after the body of liquid has been removed in the above manner. In particular, the more flexible the member 48, the more it will conform to the particular accumulation of laundry trapped between the flexible member 48 and the bottom of the rigid member 37 and thereby more effectively squeeze the moisture from such trapped laundry. Of course, the greater the air pressure being created in the chamber 60 by the pump 89 before the valve member 99 opens in opposition to the force of the compression spring 107, the greater will be the squeezing force of the flexible member on the trapped laundry.

Thereafter, the control means indexes the confining means back to the position illustrated in FIGURES 1 and 2 and the pump 89 is now operated in same condition thereof that produced the previously described squeezing action and with the confining means 25 being stationary in the position illustrated in FIGURES 1 and 2, the flexible member 48 is drawn back to the position illustrated in FIGURES 1 and 2 from its expanded condition illustrated in FIGURE 4 by having the chamber 60 now interconnected to the inlet side of the pump 89 so as to be drawn by the vacuum being created in the chamber 60 as well as by gravity back to its original condition of FIGURES 1 and 2 while the expanding chamber 62 in the confining means 25 is being supplied with air by the pump 89 interconnecting the atmosphere conduit 111 to the conduit 95 and, thus, to the conduit 69 leading to the apertured section 67. The flutes or ribs 53 on the inside surface of the rigid part 38 prevent the flexible member 48 from sealing closed the apertures 52 in the projection 51 during the movement of the flexible member 48 back to the position of FIGURES 1 and 2 so that flexible member 48 will again conform to the inside surface means of the rigid part 38 as illustrated in FIGURES 1 and 2.

With the confining means 25 now repositioned in the condition illustrated in FIGURES 1 and 2 so that the chamber 62 is now substantially hemispherical in configuration, the confining means 25 is again indexed 180° to the position illustrated in FIGURE 4 wherein rinse water or another wash water can now be introduced through the apertured section 67 for a subsequent liquid agitating and tumbling cycle in the same manner as the previously described wash cycle with such rinse or wash water being subsequently expelled therefrom in the same manner as the initial wash water was expelled therefrom by the flexible member 48 cooperating with the pump means 89 in the manner previously described.

After the desired number of wash cycles and rinse cycles have been completed by the apparatus 20 in the manner previously described, the apparatus 20 can now be utilized to dry and/or remove the remaining moisture still in the wet laundry by causing a removal of such remaining moisture in the laundry after the last squeezing action produced by the flexible member 48 during the emptying of the last rinse or wash water therefrom in the manner previously described.

In particular, after such final squeezing action, the confining means 25 is indexed to the position illustrated in FIGURES 1 and 2 and the flexible member 48 is brought back against the rigid part 38 in the manner previously described so that a substantially spherical tumble-free chamber 62 is provided for the wet laundry.

The wet laundry then is tumbled in such chamber 62 the desired number of times by rotating the confining means 25 by operation of the motor 36 without operation of the pump 89. After the desired number of tumbling cycles have been completed, the confining means is stopped in the position illustrated in FIGURE 4 and the pump 89 is now operated so that only one inlet side thereof is interconnected to the conduit 91 and its co-operating outlet side is interconnected to the conduit 95 for a closed cycle operation now to be described.

As the air in the chamber 62 is being reduced by the pump 89 drawing such air through the apertured section 67, such moisture laden air is directed by the pump 89 through the condenser 94 to have the moisture stripped therefrom in a conventional manner whereby such moisture stripped air is directed through the heating chamber 92 to be heated by the heater 93 and be directed into the chamber 60 of the confining means 25 to expand the flexible member 48 downwardly as illustrated in FIGURE 4.

The particular accumulation of laundry arranged in the confining chamber 62 in the manner illustrated in FIGURE 4 is now again subjected to a squeezing action by the flexible member 48 so that when the valve means 99 compresses against the laundry aligned between the valve member 99 and the apertured section 67, the valve member 99 opens and the heated pressurized air in the chamber 60 is now permitted to directly flow through the clothes in the general area of alignment between the opened opening means 98 and into the apertured section 67 whereby such direct air flow through such clothes to the apertured section 67 will entrain and carry the moisture therein to be expelled out through the conduit 69.

Thus, with the flexible member 48 in compressed relation against the laundry trapped between such expanded member 48 and the rigid part 37 in the manner illustrated in FIGURE 4, such continuous cycle of the pumping means 89 can continue for the predetermined period of time so that the heated air being forced and drawn through the laundry in alignment with the opened opening means 98 and the apertured section 67 will be passed through the condenser 94 to have the moisture stripped therefrom and be further heated by the heating chamber 92 to be again forced through the laundry from the chamber 60 and opening 98 of the flexible member 48.

In this manner, it can be seen that the opened opening means 98 is in full sealing relationship with the laundry trapped between the valve member 99 and the apertured section 67 while the laundry adjacent the aperture section 67 is in full sealing and compressed relation therewith so that good sealing is provided between the opening means 98 and apertured section 67 to cause the circulation of heated air to go directly through such trapped laundry to rapidly remove the remaining moisture therefrom. Of course, it is realized that the further away the parts of the accumulation of laundry are from such aligned relationship between the valve means 99 and aperture section 67 the less tendency there is for the moisture therein to be removed by such sweeping air although such moisture would tend to enter into such air flow region because of the absorbing qualities of the now dryer portions of the laundry aligned between the opening means 98 and apertured section 67.

After such drying dwell period whether the same be for a fraction of a minute or several minutes, the confining means 25 is indexed to the position illustrated in FIGURES 1 and 2 and the flexible member 48 is brought back against the rigid part 38 as illustrated in FIGURES 1 and 2 in the manner previously described and, thereafter, the confining means 25 is rotated the desired number of cycles to tumble the laundry within the confining means 25 so that a new accumulation thereof will be created in the bottom thereof against the apertured section 67 of the confining means 25 when the confining means 25 is again stopped in the position illustrated in FIGURE 4 with the apertured section 67 being at the bottom thereof. With the confining means 25 now stopped in this position of FIGURE 4, the pump 89 is again operated to interconnect its inlet to the conduit 91 and its outlet to the conduit 95 to again cause the flexible member 48 to move downwardly toward the apertured section 67 and squeeze the accumulation of laundry therebetween while providing the substantially sealed direct air flow between the subsequently opened opening means 98 and apertured section 67 to fully remove moisture from the laundry fully trapped therebetween.

Thus, it can be seen that alternating tumbling cycles and nozzle squeezing and direct air flow cycles are produced by the apparatus 20 in the manner previously described to dry the laundry in the confining means 25 to the desired degree of dryness thereof.

It may be found that after the last squeezing and direct air flow action of the flexible member 48 on the clothes, a tumbling action should be provided by the confining means 25 with the flexible member 48 back in the condition of FIGURES 1 and 2 in order to fluff the dried clothes before the same are removed from the apparatus.

In this manner, it is believed that the laundry will be dried in the laundry machine 20 of this invention at a relatively fast rate so as to be competitive with prior known combination washing and drying machines, as well as drying machine, wherein an expensive and complicated centrifuging operation must be provided on the washed laundry and followed by a relatively long conventional tumbling evaporative drying operation.

Further, because it can be seen that the laundry machine 20 of this invention operates during its washing and drying cycles in substantially a closed circuit manner, such laundry machine 20 is believed readily useable as a dry cleaning machine, if desired.

Of course, if it is desired not to utilize a closed circuit drying process wherein the moisture laden air is not to pass through a condenser to be returned to the chamber 62 through the opened opening means 98, the pump 89 illustrated in FIGURE 5 can be so constructed and arranged so that during a squeezing and direct air flow operation as being provided in FIGURE 4 one inlet side of the pump 89 could be interconnected to the conduit 91 while the cooperating outlet of the pump 89 therefor will be interconnected to the drain conduit 96 and the other inlet side of the pump 89 will be interconnected to the atmosphere line 111 and have its cooperating outlet side interconnected to the conduit 95 so that fresh air is forced through the heating chamber 92 to be heated by the heater 93 and thus, pass into the chamber 60 to pressurize the chamber 60 as well as to provide the direct fluid flow through the opening means 98 and through the trapped laundry into the apertured section 67 from which such direct flow is directed to the outlet conduit 96 by the pump 89 so as not to be returned to the confining means 25 as previously described in the operation of the apparatus 20.

While it has been previously described that the force of the compression spring 107 more or less determines the squeezing force or the pressure differential being applied across the flexible member 48 that acts against the trapped laundry 200 in FIGURE 4, it is to be understood that the flexible member 48 can have other means for providing such an opening means thereof that cooperates with the apertured section 67, if desired.

For example, the flexible member 48 could have a central perforated section that will cooperate with the apertured section 67 with the combined effect of the perforations in the flexible member 48 providing a restriction to the air flow therethrough so that the aforementioned pressure differential across the diaphragm 48 can still be created by pressurizing the chamber 60 for the aforementioned squeezing and sealing action against the trapped laundry 200 while still permitting a direct air flow between the central portion of the flexible member 48 and the apertured section 67.

Also, it might be found that such perforations could be scattered in any desired pattern throughout the entire working area of the flexible member 48 because the air flow passing through each perforation will tend to work its way toward the apertured section 67.

While the aparatus 20 of this invention has been illustrated and described as being a top loading type of laundry machine, it is to be understood that the various features of this invention can be utilized to provide a front or horizontal loading machine, if desired.

For example, reference is now made to FIGURE 8 wherein another laundry apparatus of this invention is generally indicated by the reference numeral 20A and parts thereof similar to parts of the apparatus 20 previously described are indicated by like reference numerals followed by the reference letter A.

As illustrated in FIGURE 8, the frame means 21A can carry a tubular member 112 from the front wall 30A thereof that surounds an opening 113 in the front wall 30A that is opened and closed by a front door 114 in a manner conventional in the art, the tubular member 112 telescopically receiving a cylindrical projection means 115 on the confining means 25A rotatably mounted in the frame 21A by its rear shaft means 27A being received in and rotatably supported by the combination stationary bearing and valve member 29A previously described. Thus, both the front and rear of the spherical confining means 25A is rotatably supported by the frame means 21A to be rotated by the motor 36A in a manner similar to the apparatus 20 except that the motor 36A of the apparatus 20A drives a rear pulley means 116 carried by the valve plate means 70A of the confining means 25A.

The confining means 25A of the aparatus 20A can be formed of two or more parts and in the embodiment illustrated in FIGURE 8 comprises two parts 37A and 38A with the part 37A being greater than a hemispherical configuration while the part 38A is less than a hemispherical configuration, the parts 37A and 38A securing the flexible member 48A therebetween by the turned over flange means 47A in the manner previously described. In this manner, the part 37A can be provided with a door means 66A for opening and closing an opening 65A that will always be horizontally disposed and aligned with the front door 114 of the frame 21A in any rotational position of the confining means 25A.

Of course, since the flexible member 48A is itself less than a hemispherical configuration in its natural condition, the same would tend to assume only the broken line position generally indicated by the reference numeral 117 in FIGURE 8 when expanded in the manner previously described without any stretching thereof. However, by forming the flexible member 48A from readily stretchable material, it can be seen that the member 48A can be expanded all the way down to the broken line position generally indicated by the reference numeral 118 in FIGURE 8 to completely engage the entire interior surface of the confining part 37A which would be the case if there were no clothes disposed in the confining means 25A.

The confining part 37A has an apertured section 67A, which could be a foraminous portion, in the middle of the bottom thereof as illustrated in FIGURE 8 which is disposed in sealed fluid communication with a coupling member 119 disposed in fluid communication with the conduit means 69A for the purpose previously described.

Thus, it can be seen that the apparatus 20A functions in the identical manner to the apparatus 20A previously described except that the flexible member 48A of the apparatus 20A must stretch when the same is expanded beyond the condition illustrated by the reference numeral 117 in FIGURE 8 whereas the flexible member 48 of the apparatus 20 need not be made of stretchable material, but only of flexible material. Of course, the flexible member 48 of the apparatus 20 can also be formed of flexible material, if desired.

Therefore, it can be seen that the apparatus 20A is merely a modified form of the apparatus 20 previously described except that the apparatus 20A permits horizontal front loading and unloading of the confining means 25A while the apparatus 20 provides top loading and unloading thereof.

Accordingly, it can also be seen that the various features of this invention can be utilized to provide access door means in other than a true vertical or horizontal position.

Figure 9:
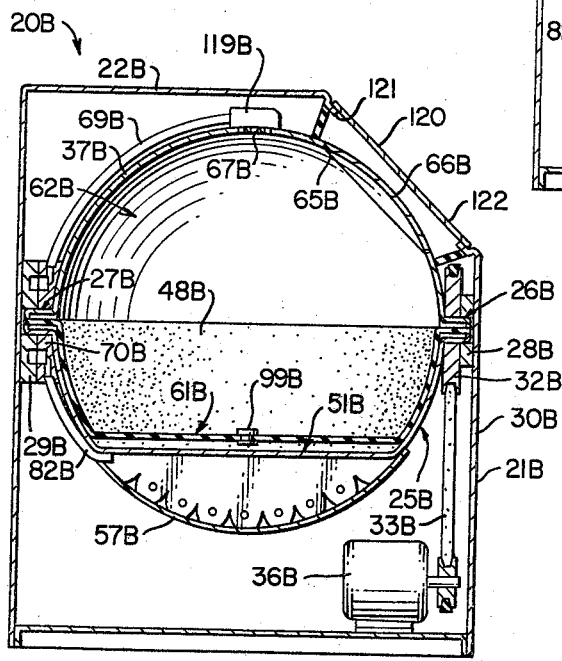
FIGURE 9 is a view similar to FIGURE 1 and illustrates still another laundry apparatus of this invention.

For example, reference is now made to FIGURE 9 wherein another apparatus of this invention is generally indicated by the reference numeral 20B and parts thereof similar to the apparatus 20 previously described are indicated by like reference numerals followed by reference letter B.

As illustrated in FIGURE 9, the frame means 21B of the apparatus 20B has an annularly disposed wall portion 120 disposed between the top wall 22B and front wall 30B thereof with such wall 120 having an opening 121 passing therethrough to be opened and closed by an angularly disposed door or lid 122.

The confining means 25B for the apparatus 20B is formed in the same manner as the confining means 20 previously described except that the rigid part 37B has a foraminous or apertured section 67B formed in the same manner as the apertured section 67A of the apparatus 20A to be interconnected by the coupling means 119B to the conduit 69B while having an access door 66B angularly disposed therein to open and close an opening 65A that is in alignment with opening 121 in the slanting wall portion 120.

Thus, the apparatus 20B operates and functions in the same manner as the apparatus 20 previously described because the flexible member 48B thereof is substantially a true hemispherical configuration so that the same can be made of non-stretchable or stretchable flexible material, if desired, just as long as the same is sufficiently flexible to perform the function previously described for the apparatus 20.

It is to be understood that while the apparatus 20, 20A and 20B have been previously described as providing liquid retaining, tumble-free, clothes receiving chambers 62, 62A and 62B, it may be desirable to utilize the features of this invention with other than such liquid retaining chamber means.

Figure 10:
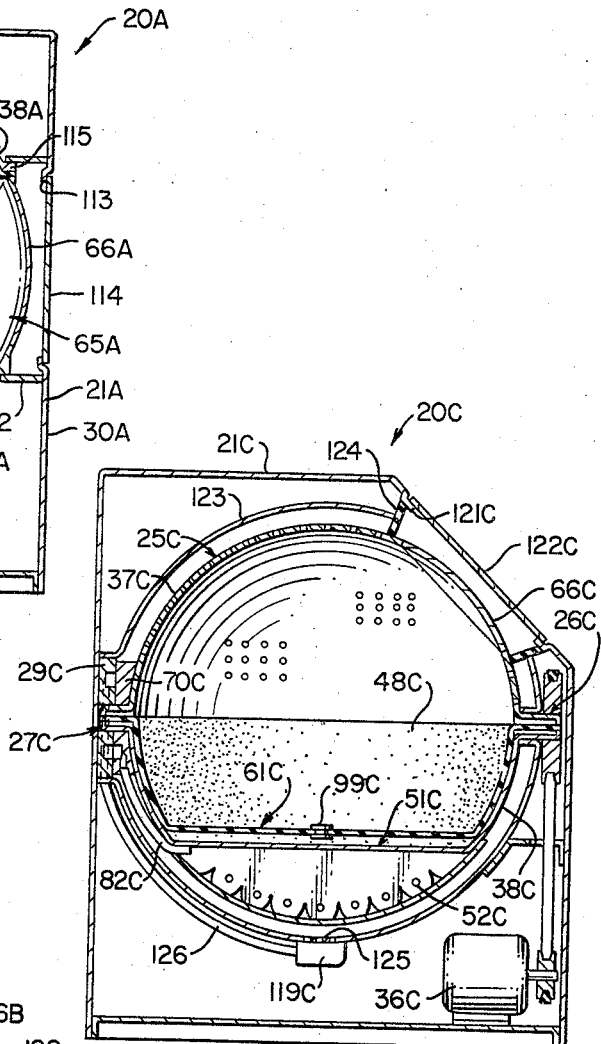
FIGURE 10 is a view similar to FIGURE 1 and illustrates another laundry apparatus of this invention.

In particular, reference is now made to FIGURE 10 wherein another apparatus of this invention is generally indicated by the reference numeral 20C and parts thereof similar to the apparatus 20 and 20B are indicated by like reference numerals followed by the reference letter C As illustrated in FIGURE 10, the apparatus 20C comprises a frame means 21C having an angularly disposed access door 122C alignable with an access door 66C formed in the hemispherical rigid part 37C that cooperates with the hemispherical rigid part 38C and flexible member 38C in the manner similar to the parts 37, 38 and 48 of the confining means 25 of FIGURE 1. However, the rigid part 37C is substantially foraminous throughout the entire area thereof and the confining means 25C is disposed for rotation in a substantially spherical, liquid retaining, stationary drum or tub 123 that cooperates with sealing means 124 around the opening 121C to retain any liquid within the tub 123 even though the confining means 25C is being rotated during a washing cycle.

Thus, an apertured section 125 is provided in the bottom of the stationary tub 123 to be coupled by a coupling member 119C to a conduit 126 which is coupled to the stationary valve plate 29C and that functions in the same manner as the conduit 69 previously described for the introduction of treating liquid into the tub 123 and for the removal thereof while the conduit 82C cooperates with the flexible member 48C in the manner previously described to expand the same and to collapse the same.

Thus, during a squeezing or drying cycle of the apparatus 20C, the confining means 25 is indexed 180° from the position illustrated in FIGURE 10 so as the flexible member 48C moves downwardly, the squeezing action produced thereby on the laundry trapped between such expanding member 48C and the formaminous area of the part 37C causes the moisture to be squeezed out of the laundry and through the perforations of the foraminous part 37C to drop onto the tub 123 and be removed therefrom out through the apertured section 125 of the stationary tub 123 by the conduit means 126 being interconnected to the inlet of the pumping device. Further, the fluid flow from the opened valve means 99C of the flexible member 48C cooperates with the foraminous part 47C of the confining means 25C to provide the direct air flow in the manner previously described.

Therefore, it can be seen that the features of this invention can be utilized with a liquid retaining laundry receiving confining means or also with a non-liquid retaining laundry receiving confining means. However, in the non liquid retaining confining means 25C of FIGURE 10, it can be seen that a suction cannot be applied directly on the compressed laundry that is trapped between the expanding member 48C and the confining part 37C as is provided by the apertured sections 67, 67A and 67B of the apparatus 20, 20A and 20B.

While all of the apparatus 20, 20A, 20B and 20C have been previously described as having the flexible member directing pressurized air therefrom when in expanded condition into the laundry or clothes being compressed between such expanded flexible member and the apertured section of the confining means, it is to be understood that such nozzle means or flexible member can apply such squeezing action in the manner previously described while at the same time be applying a suction directly on the laundry compressed and trapped between the opening means of flexible member and the apertured section of the rigid member cooperating therewith.

In particular, another apparatus of this invention is generally indicated by the reference numeral 20D in FIGURES 11–14 and parts thereof similar to the apparatus 20 previously described will be indicated by like reference numerals followed by the reference letter D.

Figure 11:
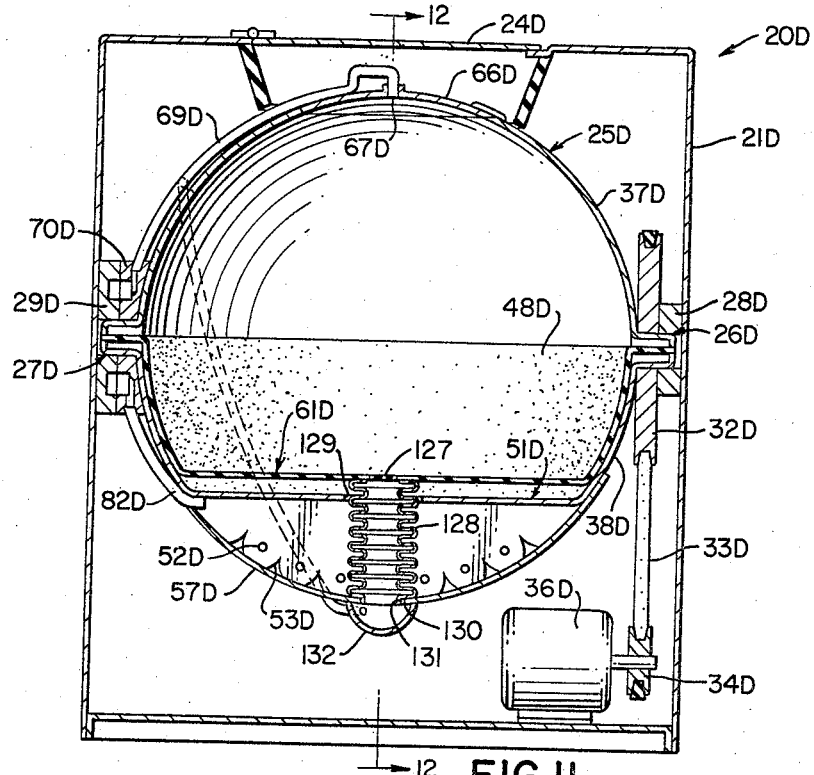
FIGURE 11 is a view similar to FIGURE 1 and illustrates another laundry apparatus of this invention.
Figure 12:
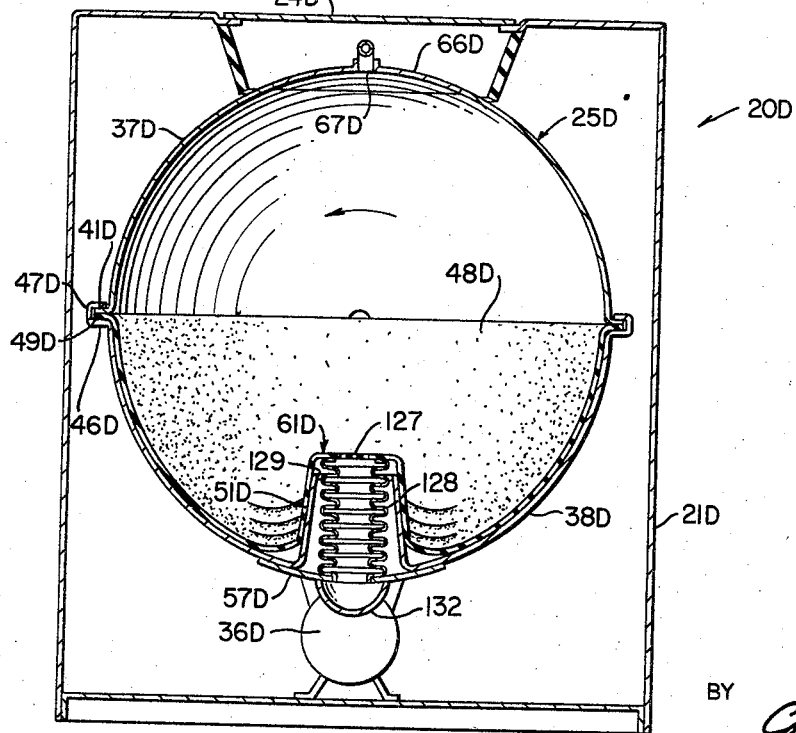
FIGURE 12 is a cross-sectional view taken on line 12—12 of FIGURE 11.
Figure 13:
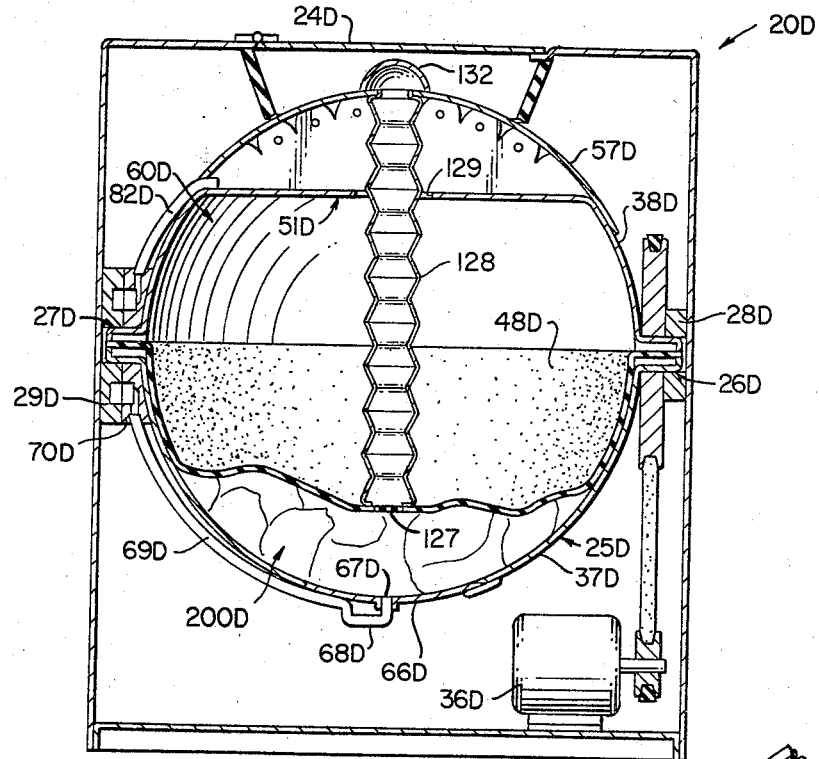
FIGURE 13 is a view similar to FIGURE 11 and illustrates the apparatus of FIGURE 11 in another operating position thereof.
Figure 14:
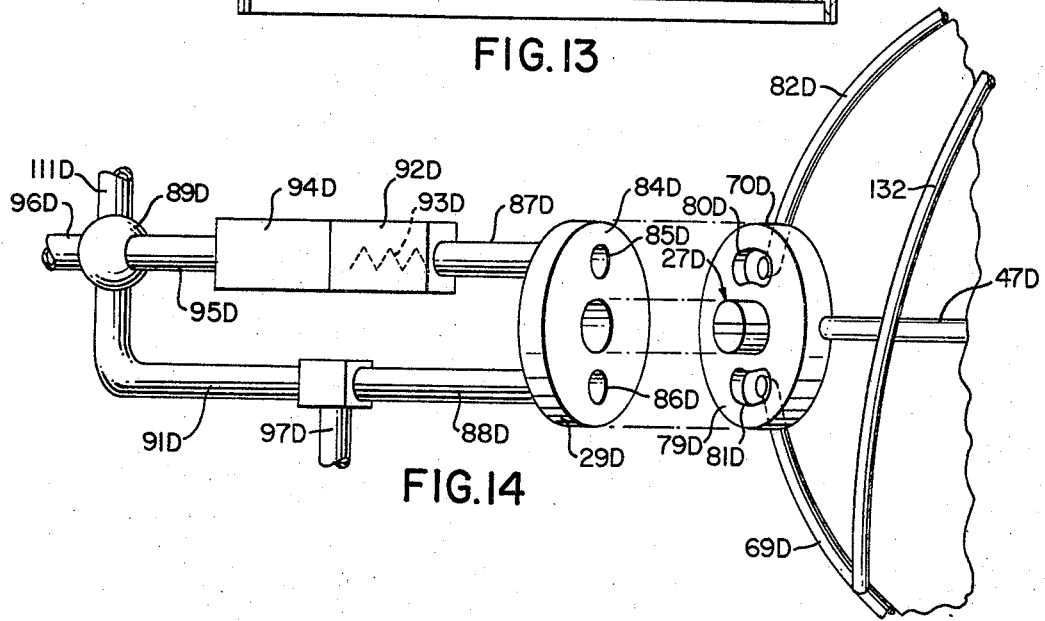
FIGURE 14 is a view similar to FIGURE 5 and illustrates the fluid control system for the apparatus of FIGURE 11.

As illustrated in FIGURES 11, 12 and 13, the laundry apparatus 20D is substantially identical to the apparatus 20 previously described except that the flexible member 48D has a foraminous or perforated central part or opening means 127 disposed in fluid communication with a longitudinally expandable and contractible bellows-like conduit 128 which is not radially expandable and contractible, the longitudinally collapsible and expandible conduit 128 passing through an opening 129 in the projecting part 51D of the rigid confining part 38D and having its outer end 130 passing through a suitable, sealed opening 131 in the plate 56D and being disposed in fluid communication with a conduit 132 that is disposed against the outside of the confining means 25 and in fluid communication to the conduit 69D leading to the apertured section 67D.

Thus, it can be seen that the control system for the apparatus 20D is substantially identical to the control system for the apparatus 20 as illustrated in FIGURES 1–5 except that the conduit 69D is in fluid communication with the conduit 132.

The operation of the apparatus 20D will now be described during a drying cycle thereof as the washing and rinsing cycles thereof are substantially identical to the apparatus 20 except that the expanded member 48D does not direct any fluid between its foraminous means 127 and the apertured section 67D as in the apparatus 20 during such squeezing action during a rinsing and washing cycle.

However, during a drying cycle, the flexible member 48D is adapted to be expanded downwardly in the manner illustrated in FIGURE 13 toward the apertured section 67D to apply a squeezing action on the clothes therein in the manner previously described except that the pressurized section or chamber 60D does not expel its pressurized fluid into the laundry. However, since the conduit 69D is having a vacuum or suction imposed thereon by the inlet side of the pump 89D during such squeezing action, a suction is also created in the conduit 128 so that the foraminous portion 127 of the expanded flexible member 48D directly draws moisture and air from the laundry disposed in sealing relation against the foraminous section 124 into the expanded conduit 128 in the manner illustrated in FIGURE 13.

Thus, it can be seen that the apertured section 67D and the foraminous part 127 of the flexible member 48D are both applying a suction on the compressed laundry trapped between the foraminous section 127 and apertured section 67D to remove moisture therefrom during each compressing cycle in the drying cycle of operation of the apparatus 20D.

Of course, during such a drying cycle of the apparatus 20D, it may be found that only the flexible conduit 128 needs be interconnected to the inlet side of the pump while the apertured section 67D could be interconnected to the outlet side thereof so as to have moisture stripped and heated air being directed upwardly into the clothes trapped between the apertured section 67D and foraminous part 127 of the flexible member 48D to be drawn into the foraminous section 127 and out of the conduit 128 by merely modifying the valve means 70D as desired.

Accordingly, it can be seen that many embodiments of this invention have been provided wherein a flexible member cooperates with a rigid member of the confining means in defining a tumble-free clothes receiving chamber to assist in both the washing, rinsing and drying cycles of the apparatus. However, it is to be understood that such features could be applied to only a drying machine or only to a washing machine, if desired. Also, each confining means could have more than one such flexible member if desired.

While the form of the invention now preferred has been disclosed as required by the statutes, other forms may be used, all coming within the scope of the claims which follow.

What is claimed is:

1. Apparatus for treating laundry and the like comprising a confining means having interior surface means defining and surrounding a free-tumbling chamber for receiving said laundry and supporting the same in said apparatus, said confining means having an apertured section defining part of said interior surface means thereof, a nozzle means carried by said apparatus and having an end means provided with opening means that is substantially in alignment with said apertured section along a plane that is generally vertically disposed, said end means of said nozzle means defining part of said interior surface means of said confining means, means for moving said surface means to tumble said laundry about an axis that is generally horizontally disposed to cause said laundry to have different sections thereof disposed between said end means of said nozzle means and said apertured section of said confining means, means for moving said end means of said nozzle means generally vertically through said generally vertically disposed plane toward said apertured section to be disposed in substantially sealed relation with a particular section of said laundry, and means for causing a fluid flow between said opening means and said apertured section substantially directly through the particular section of laundry aligned between said opening means and said apertured section of said confining means to treat said particular section of laundry with said fluid.

2. Apparatus as set forth in claim 1 wherein said means for causing said direct fluid flow comprises a suction device having its inlet operatively interconnected to said opening means of said nozzle means to draw said fluid from said particular section of laundry into said opening means of said nozzle means and having its outlet operatively interconnected to one side of said nozzle end means to force said fluid against said one side to move the other side of said nozzle end means against said particular section of laundry to squeeze the same.

3. Apparatus as set forth in claim 1 wherein said means for causing said direct fluid flow comprises a pumping device having its outlet operatively interconnected to said nozzle means to pump said fluid against one side of said nozzle end means and out through said opening means of said nozzle means into said particular section of laundry whereby the force of said fluid against said one side of said nozzle end means moves the other side of said nozzle end means against said particular section of laundry to squeeze the same.

4. Apparatus as set forth in claim 1 wherein said means for causing said direct fluid flow comprises suction means operatively interconnected to said nozzle means and to said apertured section to respectively draw fluid from said particular section of laundry and into said opening means of said nozzle means and draw fluid from said particular section of laundry and through said apertured section.

5. Apparatus as set forth in claim 1 wherein said confining means is a liquid retaining means.

6. An apparatus as set forth in claim 1 wherein said confining means comprises two rigid, substantially hemispherical parts secured together at the open ends thereof with said nozzle means comprising a flexible member secured to at least one of said parts and being adapted to be disposed against the interior surface of that one part to cooperate with the interior surface of the other part to define substantially a spherical chamber therebetween for receiving said laundry.

7. An apparatus as set forth in claim 6 wherein said other part is liquid retaining and carries said apertured section.

8. An apparatus as set forth in claim 6 wherein said other part is foraminous and thereby defines said apertured section.

9. An apparatus as set forth in claim 6 wherein said one part has an inwardly extending projection means that cooperates with said flexible member when said flexible member is disposed against said one part to define a baffle means extending into said chamber to assist in tumbling said laundry in said chamber.

10. A method for treating laundry and the like comprising the steps of supporting said laundry in a free-tumble chamber of a confining means, said chamber being defined by a surrounding interior surface means of said confining means with said interior surface means having an apertured section, providing a nozzle means in said confining means with said nozzle means having an end means provided with an opening means and with said end means defining part of said interior wall means of said confining means, said opening means being substantially in alignment with said apertured section along a plane that is generally vertically disposed, moving said laundry to cause said laundry to tumble about an axis that is generally horizontally disposed so as to have different sections thereof disposed between said end means of said nozzle means and said apertured section of said confining means, moving said end means of said nozzle means generally vertically through said generally vertically disposed plane toward said apertured section to be disposed in substantially sealed relation with a particular section of laundry, and creating a direct fluid flow between said opening means and said apertured section substantially directly through said particular section of laundry aligned between said opening means and said apertured section of said confining means to treat said particular section of laundry with said fluid.

11. Apparatus for treating material and the like comprising a confining means having interior surface means defining and surrounding a free-tumble chamber for receiving said material and supporting the same in said apparatus, said confining means having an apertured section defining part of said interior surface means thereof, a nozzle means carried by said apparatus and having an end means provided with opening means generally aligned with said apertured section, said end means of said nozzle means defining part of said interior surface means of said confining means, means for causing said material to have different sections thereof disposed between said end means of said nozzle means and said apertured section of said confining means, means for moving said end means of said nozzle means downwardly toward said apertured section to be disposed in substantially sealed relation with a particular section of said material while said particular section of material is supported on said apertured section, and means for causing a fluid flow between said opening means and said apertured section substantially directly through the particular section of material aligned between said opening means and said apertured section of said confining means to treat said particular section of material with said fluid.

12. Apparatus as set forth in claim 11 wherein said means for causing said direct fluid flow comprises a suction device having its inlet operatively interconnected to said opening means of said nozzle means to draw said fluid from said particular section of material into said opening means of said nozzle means and having its outlet operatively interconnected to one side of said nozzle end means to force said fluid against said one side to move the other side of said nozzle end means against said particular section of material to squeeze the same.

13. Apparatus as set forth in claim 11 wherein said means for causing said direct fluid flow comprises a pumping device having its outlet operatively interconnected to said nozzle means to pump said fluid against one side of said nozzle end means and out through said opening means of said nozzle means into said particular section of material whereby the force of said fluid against said one side of said nozzle end means moves the other side of said nozzle end means against said particular section of material to squeeze the same.

14. Apparatus as set forth in claim 11 wherein said means for causing said direct fluid flow comprises suction means operatively interconnected to said nozzle means and to said apertured section to respectively draw fluid from said particular section of material and into said opening means of said nozzle means and draw fluid from said particular section of material and through said apertured section.

15. Apparatus as set forth in claim 11 wherein said confining means is a liquid retaining means.

16. A method for treating material and the like comprising the steps of supporting said material in a free-tumbling chamber of a confining means, said chamber being defined by a surrounding interior surface means of said confining means with said interior surface means having an apertured section, providing a nozzle means in said confining means with said nozzle means having an end means provided with an opening means that is in general alignment with said apertured section and with said end means defining part of said interior wall means of said confining means, moving said material to cause said material to have different sections thereof disposed between said end means of said nozzle means and said apertured section of said confining means, moving said end means of said nozzle means downwardly toward said apertured section to be disposed in substantially sealed relation with a particular section of material while said particular section of material is supported on said apertured section, and creating a direct fluid flow between said opening means and said apertured section substantially directly through said particular section of material aligned between said opening means and said apertured section of said confining means to treat said particular section of material with said fluid.

References Cited

UNITED STATES PATENTS

| | | | |
|---|---|---|---|
| 2,561,120 | 7/1951 | Horvath | 68—21 |
| 2,752,770 | 7/1956 | Slate et al. | 68—21 |

FOREIGN PATENTS

| | | |
|---|---|---|
| 1,147,198 | 6/1957 | France. |

WILLIAM I. PRICE, Primary Examiner

U.S. Cl. X.R.

68—21